United States Patent [19]

Ide

[11] Patent Number: 4,596,456
[45] Date of Patent: Jun. 24, 1986

[54] COPYING APPARATUS WITH A MOVABLY MOUNTED ORIGINAL TABLE

[75] Inventor: Fumitó Ide, Zama, Japan

[73] Assignee: Kabushiki Kaisha Toshiba, Kawasaki, Japan

[21] Appl. No.: 652,054

[22] Filed: Sep. 19, 1984

[30] Foreign Application Priority Data

Sep. 22, 1983 [JP] Japan .................................. 58-175361
Sep. 28, 1983 [JP] Japan .................................. 58-179565

[51] Int. Cl.[4] ............................................. G03G 15/00
[52] U.S. Cl. ...................................... 355/3 R; 355/8;
355/3 SH; 355/14 R
[58] Field of Search ............. 355/3 R, 14 R, 8, 3 DR,
355/3 BE, 3 SH

[56] References Cited

U.S. PATENT DOCUMENTS 4,412,734 11/1983 Shibuya et al. .................. 355/3 SH
4,521,099 6/1985 Katayama et al. ..................... 355/8
4,523,831 6/1985 Yokoo et al. ...................... 355/3 R Primary Examiner—A. C. Prescott
Attorney, Agent, or Firm—Cushman, Darby & Cushman

[57] ABSTRACT

In a copying apparatus, an original image signal is obtained by optically scanning an original surface using an original rest slidably mounted on a housing. The copying apparatus has a construction for detecting malfunctions such as a paper jam or a toner empty state, and a mechanism for forcibly moving the original rest to a position suitable for eliminating a paper jam or a position suitable for replenishing the toner, when these malfunctions are detected.

6 Claims, 26 Drawing Figures

COPYING APPARATUS WITH A MOVABLY MOUNTED ORIGINAL TABLE

BACKGROUND OF THE INVENTION

The present invention relates to a copying apparatus which is arranged such that a moving table having an original or a light source is moved so as to perform a scanning operation of the surface of the original using light from the light source.

In copying apparatus of this type having an original rest on which an original is placed, a copying machine is known wherein an upper unit holding the original rest can be opened to be inclined with respect to a lower unit about one hinged end thereof. According to this arrangement, when a paper jam occurs in a copying machine main body, an operator can open the upper unit to pick up a jamming paper sheet from the interior of the copying machine. In this case, since the original rest is movable with respect to the upper unit, when the upper unit is inclined carelessly, the original rest moves along the upper unit due to gravity, thereby damaging the original rest or the copying machine main body due to the impact of this movement.

On the other hand, in copying apparatus of original rest moving type, a toner replenishment port of a developer is generally provided in the way of a moving path of the original rest. Generally, since a stop position of the original rest (in the non-copying mode) is set at a position at which the toner replenishment port is covered, when a toner empty state is displayed on a display panel, the operator must manually move the original rest so as to open the toner replenishment port.

SUMMARY OF THE INVENTION

It is an object of the present invention to provide a copying apparatus which, in a copying apparatus which moves a moving table having an original or a light source for scanning a surface of an original, can easily perform maintanance and check operations without causing damage due to an impact of movement of an original rest by the careless operation of an operator, when a malfunction such as paper jam or toner empty state occurs.

According to the present invention, in order to achieve the above object, there is provided a copying apparatus, having a moving table slidably mounted on a copying apparatus main body, which comprises a means for detecting a malfunction of the copying operation and a means for stopping the moving table at a predetermined position in response to a malfunction detection signal.

DETAILED DESCRIPTION OF THE PREFERRED EMBODIMENT

Figure 1A:
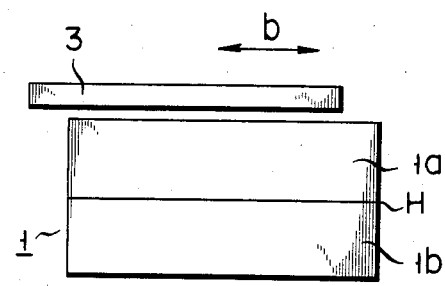
FIGS. 1A to 1C are respectively representations for explaining a movement of a moving table, i.e., original rest according to an embodiment of the present invention.
Figure 1B:
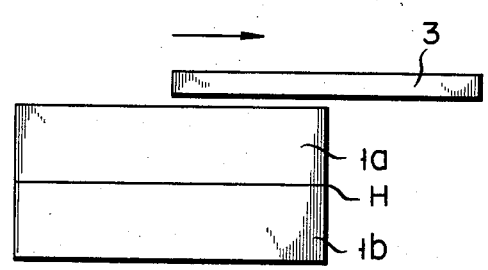
Figure 1C:
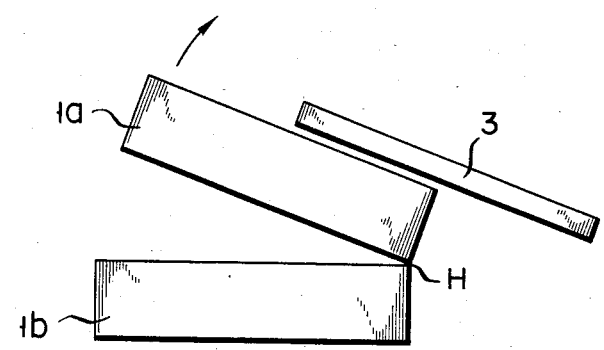

FIGS. 1A and 1B schematically show the operation of an embodiment of the present invention, respectively. In FIG. 1A, an original rest 3 is mounted on an upper unit 1a of a copying apparatus housing 1 to be slidable along a horizontal direction indicated by the arrow b. The upper unit 1a is hinged to a lower unit 1b at one end H thereof, and is arranged to be freely opened/closed to the lower unit 1b.

Assume that a paper jam occurs for any reason during the copying operation. In this case, this paper jam is detected by a paper jam detecting mechanism provided in the housing 1, and the copying operation is thereby stopped. Assume that the original rest 3 is stopped at a position shown in FIG. 1A. This position of the original rest 3 is detected by an original rest position detecting mechanism provided in the housing 1. Then, the original rest 3 is forcibly moved by an original rest driving mechanism to a prescribed original rest stop position, i.e., in this case, a position shown in FIG. 1B.

When a paper jam state is displayed on a display panel (not shown) of the housing 1, an operator lifts up the upper unit 1a and picks up a jamming paper sheet from an exposed paper sheet convey path, thereby restoring a function of the copying apparatus.

Figure 2:
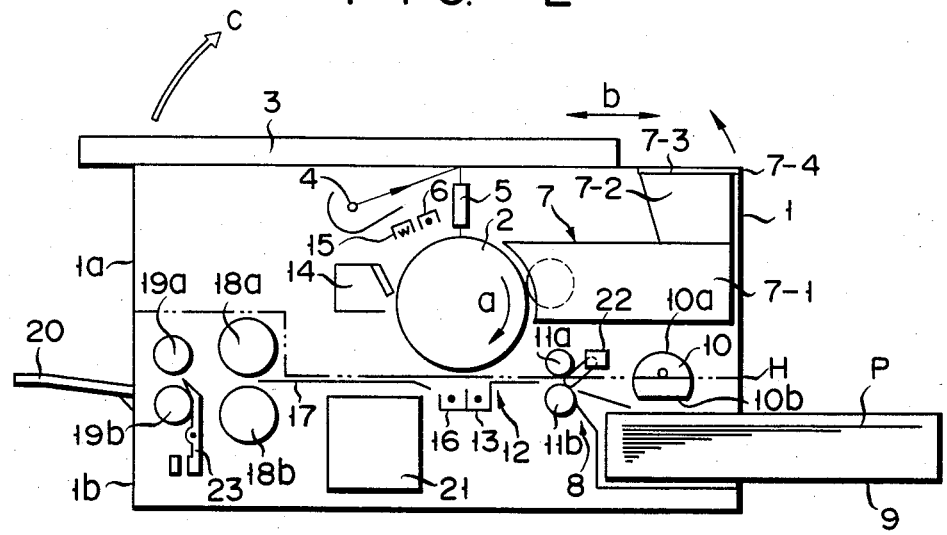
FIG. 2 is a block diagram showing an arrangement of a copying apparatus of the embodiment shown in Figs. 1A to 1C.

An arrangement of this embodiment will be described with reference to FIGS. 2 to 13 hereinafter. In FIG. 2, a photosensitive drum 2 is mounted at a substantially central portion in the upper unit 1a of the housing 1 so as to rotate in a direction indicated by the arrow a. The original rest 3 which supports an original is mounted on an upper surface of the housing 1 so as to reciprocate along a direction indicated by the arrow b. Therefore, the original rest 3 is moved in syncronism with the rotation of the photosensitive drum 2. Then, light irradiated from an exposure lamp 4 is reflected by the original placed on the original rest 3, and this reflected light forms an image (i.e., an inverted image of an image on an original) on the photosensitive drum 2 by a converging light transmission body 5. In this case, the inverted image is formed as an electrostatic latent image on the photosensitive drum 2 upon charging the photosensitive drum 2 with a charger 6. Toner is applied on this latent image by a developer 7, thereby forming a toner image.

On the other hand, a paper feed mechanism 8 for feeding a paper sheet P below the photosensitive drum 2 (i.e., an image transfer unit 12) is provided in the lower unit 1b below the developer 7. The paper feed mechanism 8 comprises a paper feed cassette (paper storing unit) 9, which is detachably mounted at a side of the housing 1, for storing a plurality of the paper sheets P and a paper feed roller (paper feed means) 10 for feeding the paper sheets P one by one from the paper feed cassette 9. In addition, the paper feed mechanism 8 comprises a pair of aligning rollers (conveying means) 11a, 11b for aligning a leading edge of the paper sheet P fed by the paper feed roller 10 and conveying it. The paper feed roller 10 is a roller having a semi-circular cross-section and a contact portion 10a and noncontact portion 10b with respect to the paper sheet P. Driving power of a motor is transmitted by turning on a solenoid of a spring clutch (to be described later) for rotating the paper feed roller 10, and the paper feed roller 10 is stopped after rotating through a predetermined angle (e.g., 210 degrees).

Therefore, the paper sheet P conveyed by the aligning rollers 11a, 11b is fed to the image transfer unit 12. The paper sheet P which is fed to the image transfer unit 12 is brought into tight contact with the surface of the photosensitive drum 2 at a portion of a transfer charger 13, thereby transferring, by charging the paper sheet P with the charger 13, a toner image formed on the photosensitive drum 2. Then, after the transfer operation, residual toner on the surface of the photosensitive drum 2 is removed therefrom by a cleaner 14, and a residual image is discharged by a discharging lamp 15, thereby restoring the drum 2 to its initial state. On the other hand, after the transfer operation, the paper sheet P is electrostatically peeled from the photosensitive drum 2 by the operation of a peeling charger 16, and thereafter is conveyed along a convey path 17 to a pair of heat rollers 18a, 18b. Then, by passing through the heat rollers 18a, 18b, the transferred image is thermally fixed on the paper sheet P. Thereafter, the paper sheet P is discharged by a pair of paper discharging rollers 19a, 19b onto a tray 20 which is provided outside the housing 1. The photosensitive drum 2, the original rest 3, the developer 7, the paper feed roller 10, the aligning rollers 11a, 11b, the heat rollers 18a, 18b and the paper discharging rollers 19a, 19b are operated by a motor 21 as a driving source.

A switch (which will be referred to as a paper feed switch hereinafter) 22 is provided near (in front of) the aligning rollers 11a, 11b as a detector for detecting a paper feeding state. Furthermore, a switch (which will be referred to as a paper discharging switch hereinafter) 23 is provided near (in front of) the paper discharging rollers 19a, 19b as a detector for detecting a paper discharging state. These switches 22 and 23 are provided mainly for detecting a paper jam occuring therebetween.

Note that the housing 1 is divided into the upper and lower units 1a and 1b by the convey path 17, as indicated by the two short dashed and alternate long line in FIG. 2. The upper and lower units 1a and 1b are pivotally supported on a pivot shaft (not shown) provided at one end H thereof, and the unit 1a can be opened in a direction indicated by the arrow c to a predetermined angle. In the upper unit 1a, the photosensitive drum 2, the original rest 3, the exposure lamp 4, the converging light transmission body 5, the charger 6, the developer 7, the paper feed roller 10, the upper aligning roller 11a, the cleaner 14, the discharging lamp 15 and the like are provided. On the other hand, in the lower unit 1b, the paper feed cassette 9, the lower aligning roller 11b, the chargers 13 and 16, the convey path 17, the heat rollers 18a, 18b, the discharging rollers 19a, 19b, the tray 20, the motor 21 and the like are provided. A toner hopper 7-2 is provided in a portion above the developer 7 facing the travelling path of the original rest 3. A toner replenishment port 7-3 of an upper portion of the toner hopper 7-2 is closed by a hopper cover 7-4. The detailed configuration of these parts will be described later.

Figure 3:
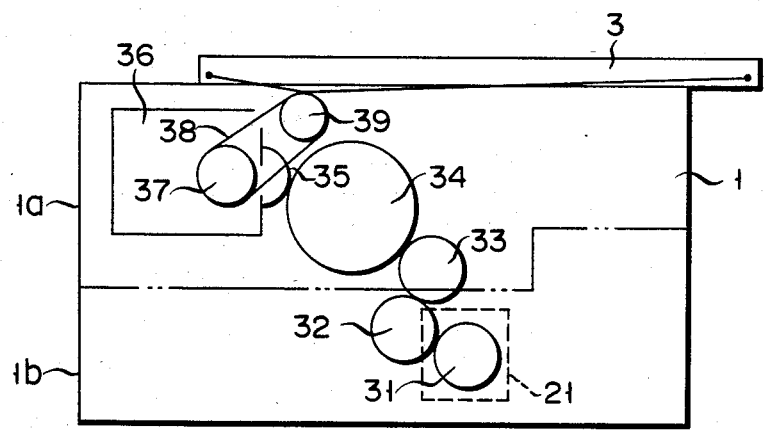
FIG. 3 is a view schematically showing an original rest driving mechanism according to this embodiment.

FIG. 3 shows the original rest driving mechanism. Driving power of a gear 31 directly coupled to the motor 21 is transmitted to an electromagnetic clutch 36 through gears 32, 33, 34 and 35 for transmitting power. The electromagnetic clutch 36 is switched in accordance with a control signal among the state wherein it does not transmit the driving power to a pulley 37, the state wherein it transmits the power in a forward direction, and the state wherein it transmits the power in a reverse direction. The driving power transmitted to the pulley 37 is transmitted to the original rest 3 by a wire 38, two ends of which are fixed to the original rest 3, thereby moving the original rest 3 in forward and backward directions. A pulley 39 is provided for regulating the wire 38 so as to be substantially parallel to the original rest 3 and not to be in contact with other portions.

Figure 4:
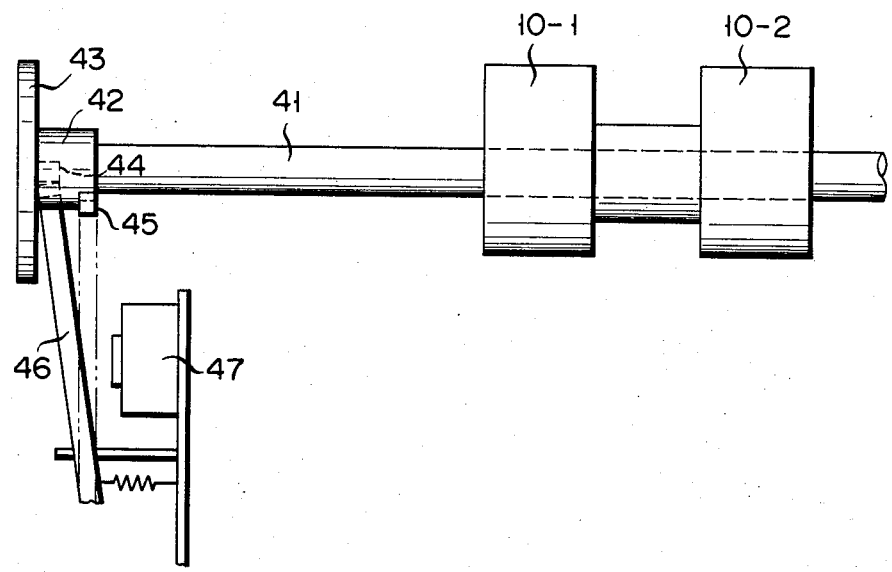
FIG. 4 is a view showing a paper feed roller driving mechanism.

FIG. 4 shows the paper feed roller driving mechanism. The paper feed rollers 10-1, 10-2 having a semi-circular cross-section are fixed to a rotating shaft 41 one end of which is fixed to a sleeve 42. The sleeve 42 is coupled to a gear 43, to which the driving power of the motor 21 is transmitted through a spring clutch (not shown). In other words, the driving power of the gear 43 is transmitted to the sleeve 42 through the spring clutch. Projections 44 and 45 are provided on a peripheral surface of the sleeve 42 at positions shifted along the axial direction of the rotation shaft 41 by an angle of about 210 degrees. The driving power of the gear 43 is transmitted to the sleeve 42 unless the projection 44 or 45 are locked by a lock lever 46. The lock lever 46 is driven by a paper feed roller solenoid 47. When the solenoid 47 is turned off, the lock lever 46 locks the projection 44, as indicated by the solid line. On the other hand, when the solenoid 47 is turned on, the lock lever 46 locks the projection 45, as indicated by the two dashed line.

Figure 5:
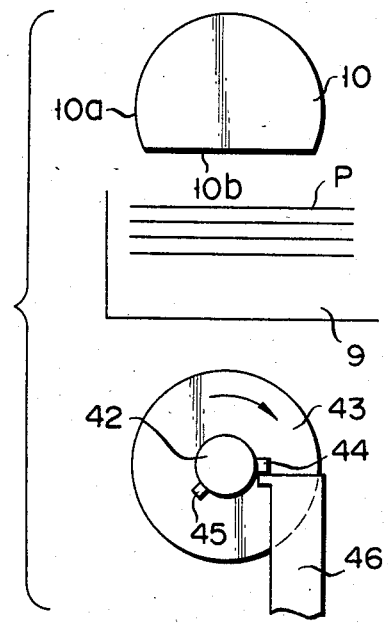
FIGS. 5 to 7 are respectively views showing the operation of the paper feed roller driving mechanism.
Figure 6:
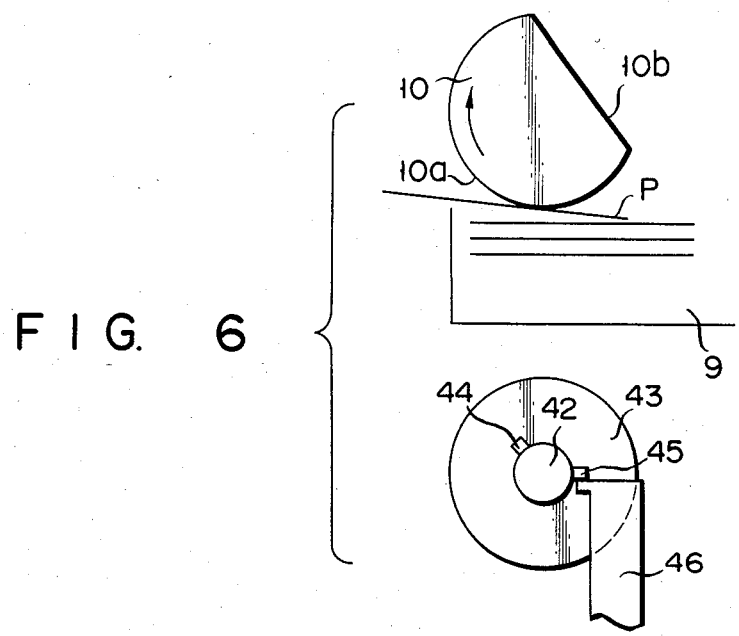
Figure 7:
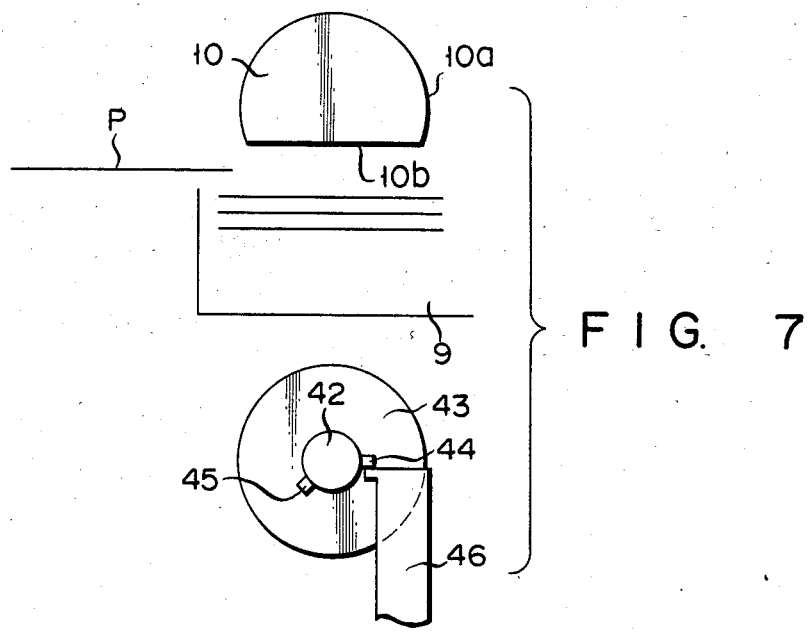

The paper feeding operation will now be described with reference to FIGS. 5 to 7. Normally, the paper feed roller 10 and other driving mechanisms are in the state shown in FIG. 5. (The rollers 10-1, 10-2 in FIG. 4 are denoted by numeral 10 in FIGS. 5 to 7, for the sake of simplicity.) Even if the driving power of the motor 21 is applied to the gear 43 in a direction indicated by the arrow, since the solenoid 47 is turned off and the projection 44 is locked by the lock lever 46, the paper feed roller 10 is not rotated and kept in the state shown in FIG. 5. In this state, if the solenoid 47 is turned on, the driving power of the motor 21 is transmitted to the sleeve 42 as described above, and the sleeve 42 is rotated until the projection 45 is locked by the lock lever 46. Simultaneously, the paper feed roller 10 is rotated while feeding the paper sheet P stored in the paper feed cassette 9, and still presses the paper sheet P having the trailing edge in the cassette 9 as shown in FIG. 6. Then, the solenoid 47 is turned off in synchronism with the rotation of the aligning rollers 11a, 11b, thereby restoring the state shown in FIG. 5 again, that is, the state shown in FIG. 7. In this case, the paper feed roller 10 returns to the same state as shown in FIG. 5 while further pushing the paper sheet P, as shown in FIG. 7.

Figure 8:
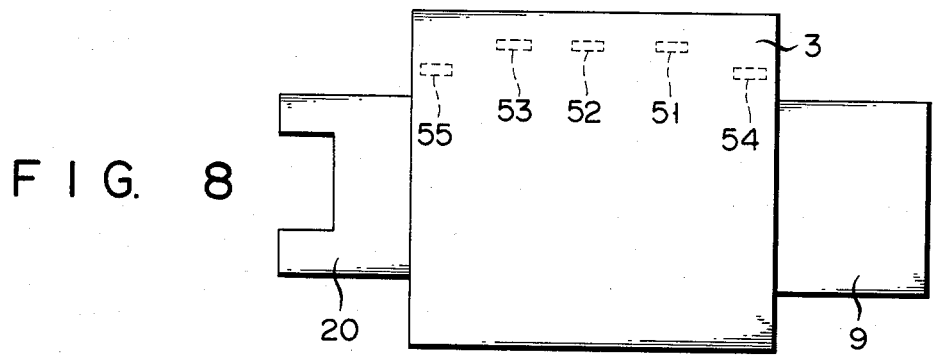
FIGS. 8 to 11 are respectively views for explaining the operation of an original rest position detecting mechanism.
Figure 9:
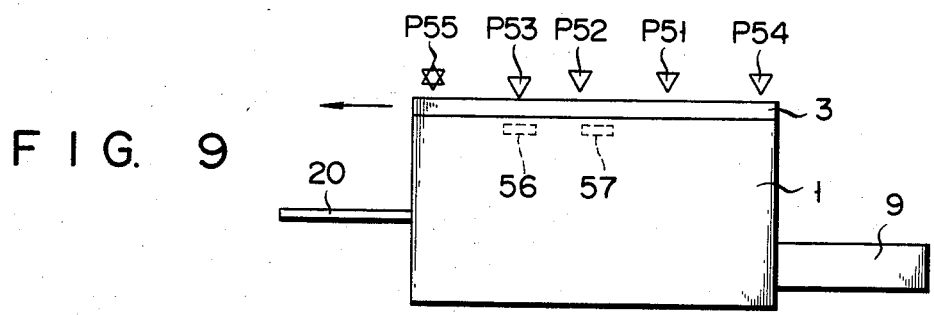

FIGS. 8 to 11 show the original rest position detecting mechanism. As shown in FIG. 8, three magnets 51 to 53 are linearly provided in the original rest 3 along the travelling direction thereof spaced by a predetermined distance apart, respectively. Furthermore, two magnets 54 and 55 are provided to have positions shifted toward the transverse direction of the original rest 3 at two end portions of the array of these magnets 51 to 53. As shown in FIG. 9, in the housing 1, lead switches 56 and 57 are provided for detecting these magnets 51 to 55. The lead switch 56 is provided to detect the magnets 51 to 53 located thereabove, and the lead switch 57 is provided to detect the magnets 54 and 55 located thereabove. Therefore, the lead switches 56 and 57 are also provided to have their positions shifted in the transverse direction of the rest 3.

Figure 10:
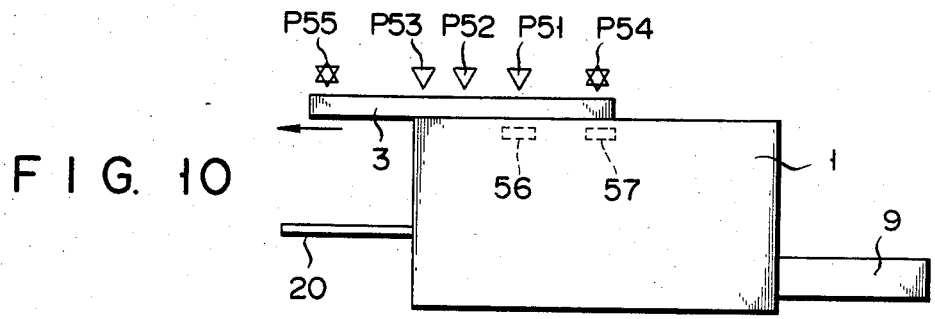
Figure 11:
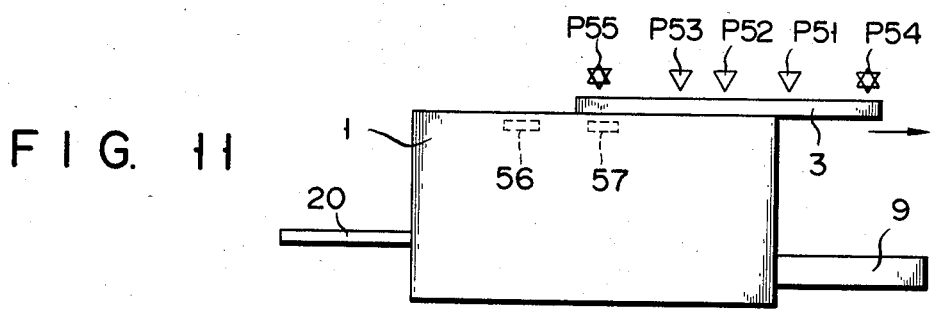

In FIGS. 9 to 11, assume that positions of the magnets detected by the lead switch 56 are given by P51, P52 and P53, and positions detected by the lead switch 57 are given by P54 and P55. FIG. 9 shows the state wherein the original rest 3 is positioned at a home position. The home position is a position at which the original rest 3 is stopped when the copying operation ends. The home position is detected by the following operations wherein, the original rest 3 starts to move in a direction indicated by the arrow in FIG. 9 (which will be referred to as a backward direction hereinafter) from a movement stop position (which will be referred to as an original rest limit position) shown in FIG. 11 and the lead switch 56 is turned on for the first time, that is, it is turned on by the magnet 53. The original rest position is detected when only the lead switch 57 is first turned on by the magnet 54 during the forward direction of the rest 3 as shown in FIG. 11. FIG. 10 shows the state wherein the original rest 3 is positioned at another movement stop position (which will be referred to as an original rest start position) along the backward direction. The original rest start position is detected when the lead switches 56 and 57 are simultaneously turned on by the magnets 51 and 54. Furthermore, an aligning roller start position is detected by the following operations. When the original rest 3 starts from the original rest start position of FIG. 10, the lead switch 56 is turned on for the first time, that is, it is turned on by the magnet 52, thereby detecting the aligning roller start position. As described above, since the photosensitive drum 2 is driven in synchronism with the original rest 3, a timing for starting the rotation of the aligning rollers 11 can be set not by the original rest 3, but by the photosensitive drum 2, such that a leading edge of the image formed on the photosensitive drum 2 coincides with that of the paper sheet P. The position from which the aligning rollers 11a, 11b start to rotate is the aligning roller start position.

Figure 12:
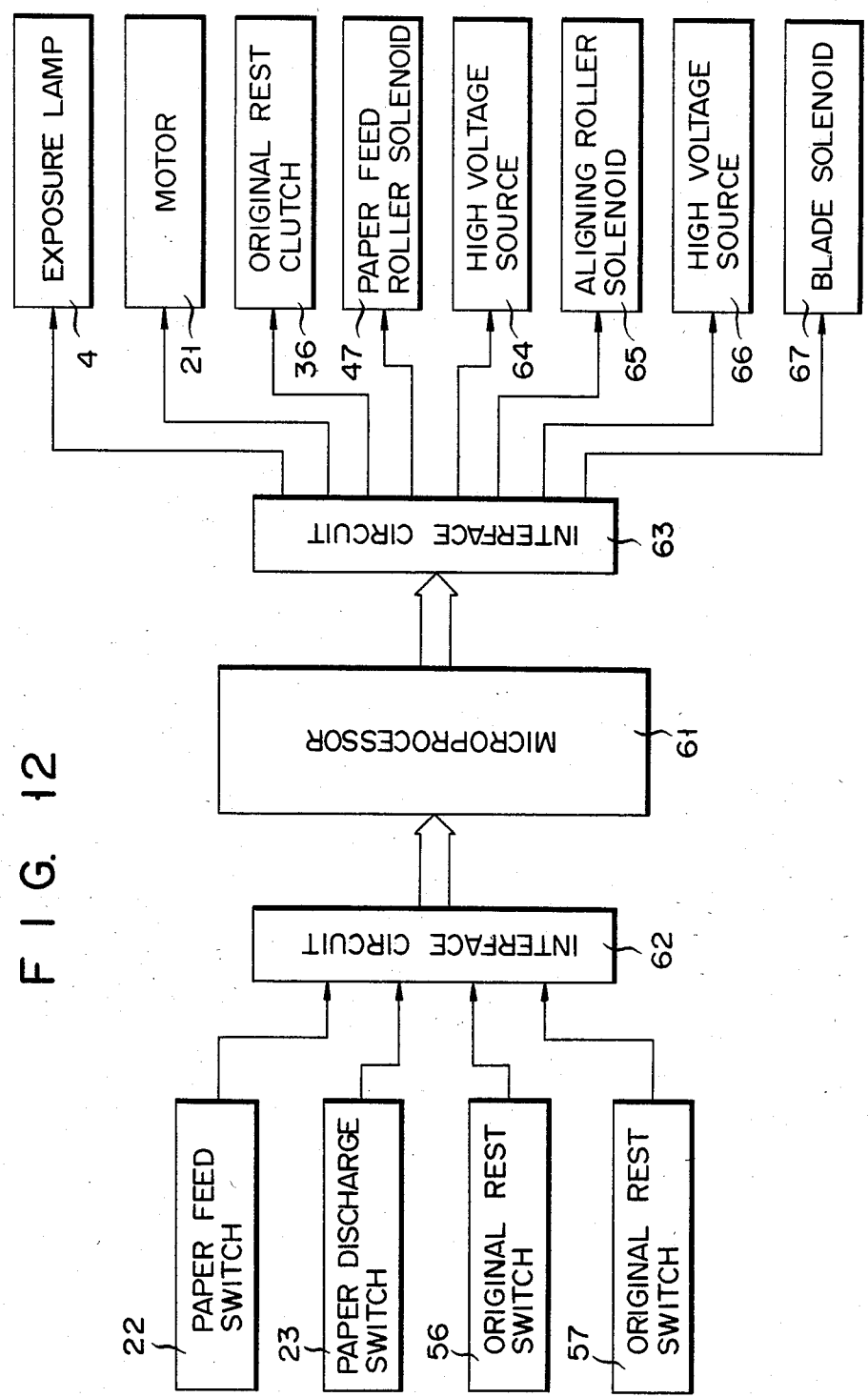
FIG. 12 is a block diagram showing an overall circuit configuration of this embodiment.

FIG. 12 schematically shows an overall control circuit. Reference numeral 61 denotes a microprocessor as a main controller for performing the overall control operation. Respective input signals generated from the paper feed switch 22, the paper discharge switch 23, the lead switches 56 and 57 (will be referred to original rest switches hereinafter) and the like are supplied to the microprocessor 61 through an interface circuit 62. The microprocessor 61 determines, in accordance with a predetermied program stored therein, these input signals and processes them so as to generate various control signals which are sent to respective control devices. The respective contol devices include the exposure lamp 4, the motor 21, the electromagnetic clutch (which will be referred to as an original rest clutch hereinafter) 36, the paper feed roller solenoid 47, a high voltage source 64 for supplying power to the charger 6, an aligning roller solenoid 65 for transmitting driving power to the aligning rollers 11a, 11b, a high voltage source 66 for supplying power to the transfer charger 13 and the peeling charger 16, a blade solenoid 67 for urging a blade of the cleaner 14 against the photosensitive drum 2 and the like, and they are operated by corresponding control signals, respectively.

Figure 13:
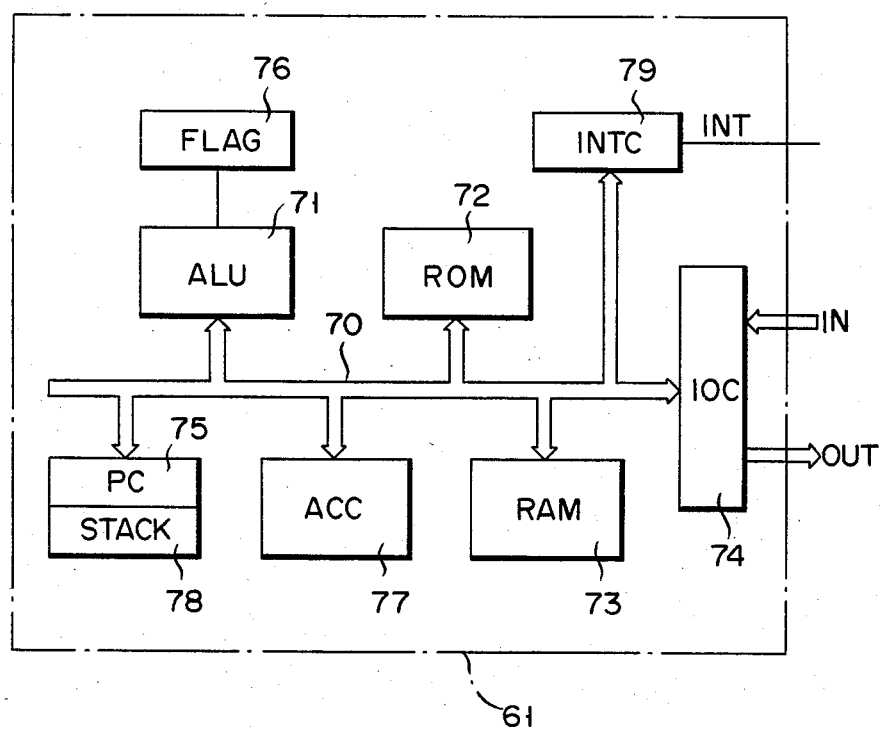
FIG. 13 is a block diagram of a microprocessor shown in FIG. 12.

The microprocessor 61 has, for example, a configuration as shown in FIG. 13. In other words, the microprocessor 61 may be a one-chip microprocessor having an architecture as shown in FIG. 13. In FIG. 13, an arithmetic and logic unit (ALU) 71 having an arithmetic and logic determination function is coupled to each unit through a bus 70. Reference numeral 72 denotes a read only memory (ROM) for storing a processing program; 73, a random access memory (RAM) for storing data; 74, an I/O controller (IOC) for supplying/receiving signals to/from an external circuit; 75, a program counter (PC); 76, a flag (FLAG) register; 77, an accumulator (ACC); 78, a stack register (STACK); and 79, an interrupt controller (INTC).

The operation of the microprocessor 61 will be briefly described hereinafter. When an address of the processing program stored in the ROM 72 is designated by the PC 75, and an instruction read out from the ROM 72 is decoded, this instruction is executed. The FLAG register 76 stores carry and borrow states of results of a calculation operation. The calculation results are stored in the ACC 77 or in the RAM 73 by an instruction through the ACC 77. The STACK 78 designates a depth of a subroutine, and stores a return address of a main routine and is used as a content save storage for the PC 75 in an interrupt mode. When an internal interrupt request signal or an interrupt signal at an external terminal (INT) is supplied to the INTC 79, the INTC 79 interrupts the instruction being executed, and executes an interrupt processing. During such an interrupt processing, the content of the PC 75 is temporarily saved in the STACK 78, and an address jumps to a specific address for executing the interrupt processing so as to complete the interrupt processing program. Thereafter the flow returns to the main program.

Figure 14:
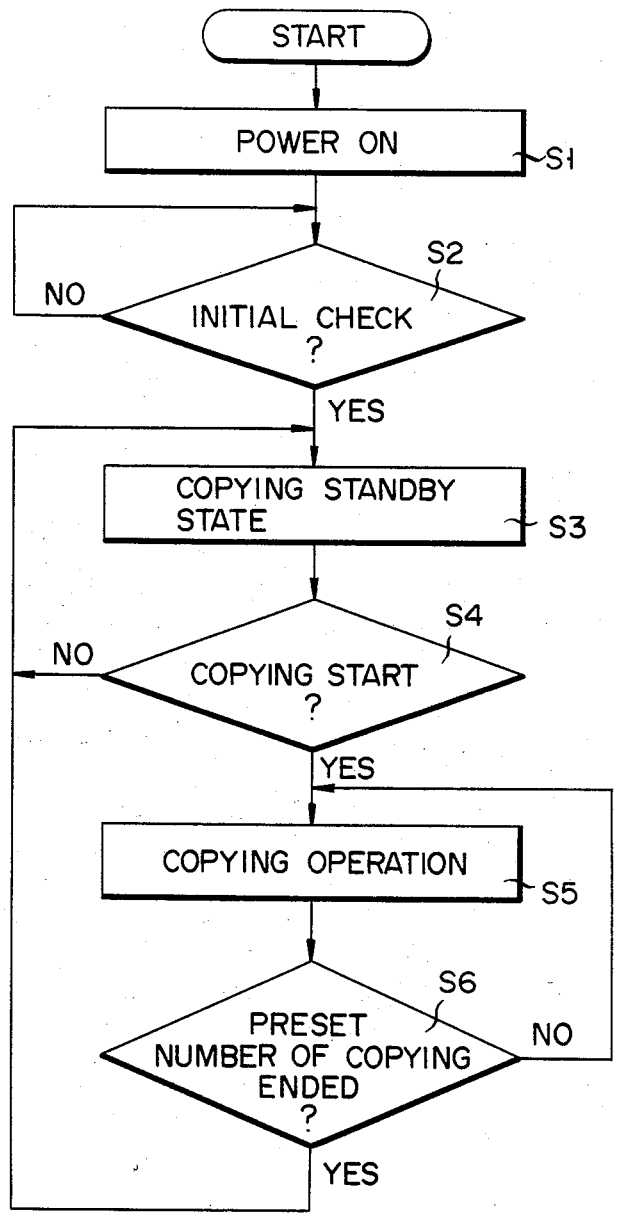
FIG. 14 is a flow chart of the normal operation of the copying machine.

FIG. 14 shows a general flow chart of a normal copying apparatus. Note that an initial check of the step S2 means a routine for checking whether or not the copying apparatus is in the copying mode, for example, whether or not the heat rollers are at a fixing temperature. After executing the initial check, if YES in this step, the routine advances to a copying standby state step S3. This step S3 is for waiting until the number of copying paper sheets is preset and a copying switch is turned on and then the copying operation starts. When the copying operation starts, the copying processes comprising the charging, exposing, transferring, discharging and fixing operations are sequentially performed to accomplish the copying operation, and are repeated until the preset number of copying paper sheets are copied. In addition, during the copying operation, malfunction such as a paper jam is also checked for.

Figure 15A:
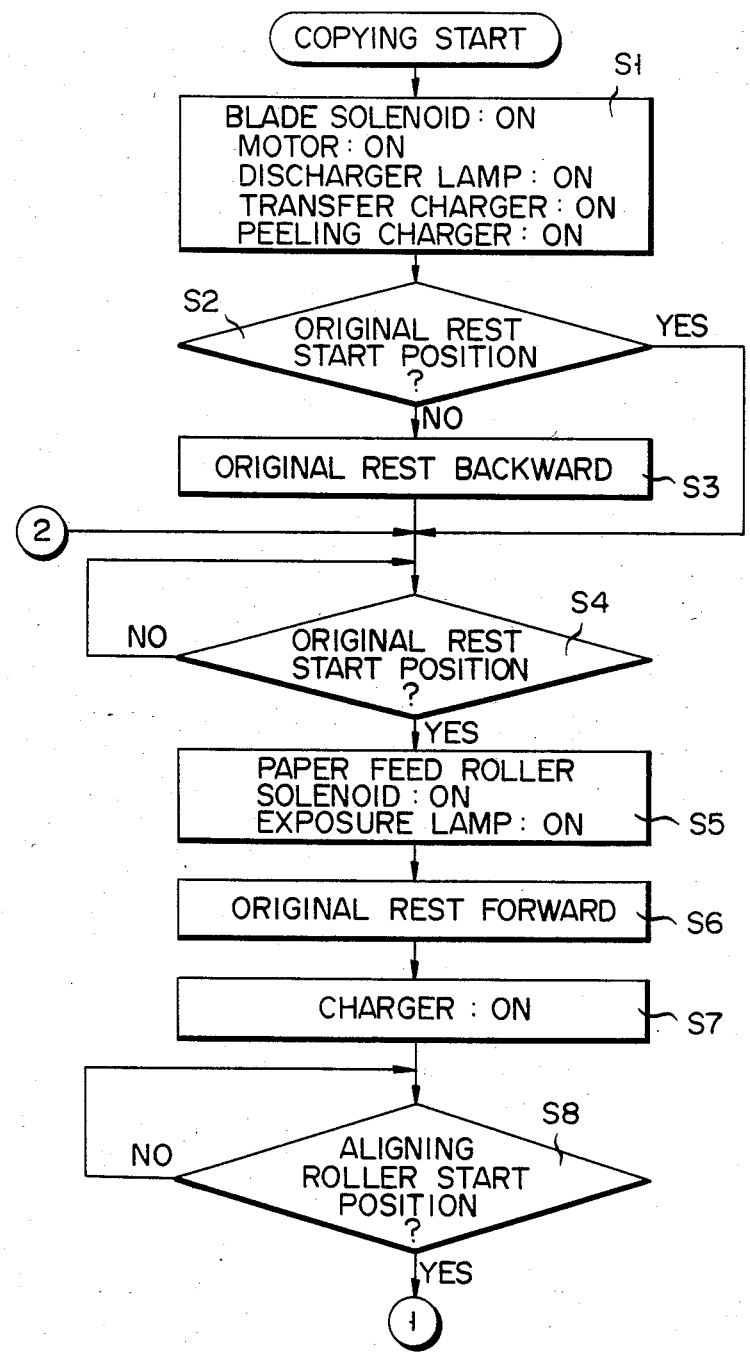
FIGS. 15A and 15B are respectively flow charts of the copying operation.
Figure 15B:
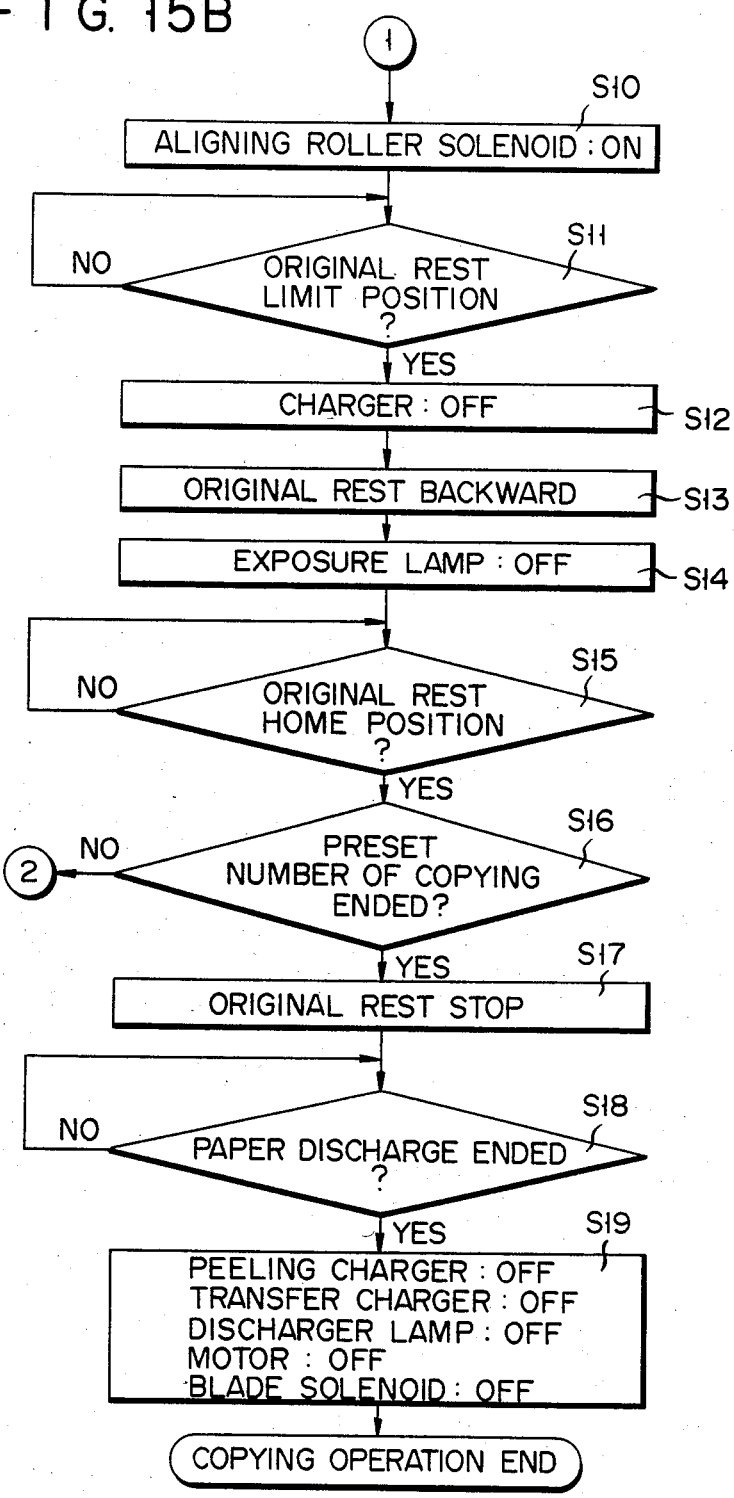

Furthermore, the control during the copying operation will now be described with reference to the flow chart shown in FIGS. 15A and 15B. When the copying operation starts, the flow of FIG. 15A advances to step S1. In step S1, the blade solenoid 67, the motor 21, the discharging lamp 15, and the high voltage source 66 (for the chargers 13 and 16) are respectively turned on, and then the routine advances to step S2. In step S2, the microprocessor 61 determines, in accordance with signals from the original rest switches 56 and 57, whether or not the original rest 3 is positioned at its start position. If NO in step S2, the operation advances to step S3. In step S3, a control signal is supplied to the original rest clutch 36 so as to move the original rest 3 in the backward direction, and the operation advances to step S4. On the other hand, if YES in step S2, the flow jumps to step S4. In step S4, the original rest 3 is moved to the original rest start position, and when both the original rest switches 56 and 57 are turned on to indicate the original rest start position, the routine advances to step S5. In step S5, a control signal is supplied to the paper feed roller solenoid 47 so as to rotate the paper feed roller 10 and the exposure lamp 4 is turned on, and then the operation advances to step S6. In step S6, the control signal is supplied to the original rest clutch 36, thereby moving the original rest 3 in the forward direction, and the operation advances to step S7. In step S7, the high voltage source (the charger 6) is turned on, and the operation advances to step S8. In step S8, the microprocessor 61 determines whether or not the aligning roller is positioned at its start position. If YES in step S8, the operation advances to step S10 of FIG. 15B. In step S10, a control signal is supplied to the aligning roller solenoid 65 so as to rotate the aligning rollers 11a, 11b, and the operation advances to step S11. In step S11, the microprocessor 61 determines whether or not the original rest 3 is moved to the original rest limit position which is detected when only the original rest switch 57 is turned on. If YES in step S11, the operation advances to step S12. In step S12, the high voltage source 64 is turned off and the operation advances to step S13. In step S13, a control signal is supplied to the original rest clutch 36 so as to move the original rest 3 in the backward direction, and the operation advances to step S14. In step S14, the exposure lamp 4 is turned off and the operation advances to step S15. In step S15, the microprocessor 61 determines whether or not the original rest 3 is moved to the home position which is detected when the orignal rest switch 56 is turned on. If YES in step S15, the operation advances to step S16. In step S16, the microprocessor 61 determines whether or not the preset number of copy sheets has been produced. If NO in step S16, the operation returns to step S4 of FIG. 15A and the above-mentioned copying operation is repeated. If YES in step S16, the routine advances to step S17. In step S17, a control signal is supplied to the original rest clutch 36 so as to stop the original rest 3 at the home position, and the operation advances to step S18. In step S18, the microprocessor determines, in accordance with the signal supplied from the paper discharge switch 23, whether or not the copied paper sheet P has been completely discharged. If YES in step S18, the operation advances to step S19. In step S19, the high voltage source 66, the discharging lamp 15, the motor 21 and the blade solenoid 67 are respectively turned off, thereby ending the copying operation, and the copying apparatus is set in the copying standby state of step S3 of FIG. 14.

Figure 16:
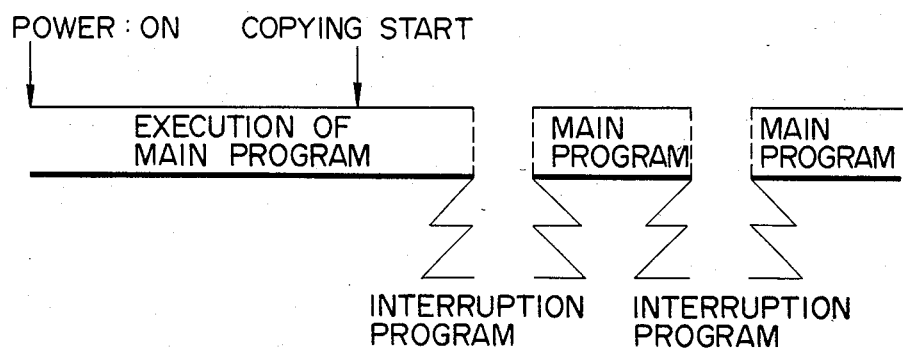
FIG. 16 is a flow chart of a program of the microprocessor.

The interrupt operation of the copying apparatus is performed by using an internal interrupt request generated within the microprocessor 61. This interrupt processing is preset to be repeatedly performed at every predetermined period. This interrupt processing will be described with reference to FIG. 16. A main program among the programs stored in the ROM 72 is executed upon energization of the copying apparatus. When the INTC 79 is set to generate an internal interrupt every 12 msec after the copy operation is started, the main program is temporarily interrupted after a lapse of 12 msec since the copy operation was started. When the interrupt program is completed, the main program is accessed again. In addition, when a period of 12 msec has elapsed, i.e., when a period of 24 msec has elapsed since the copy operation was started, the interrupt program is executed.

Figure 17A:
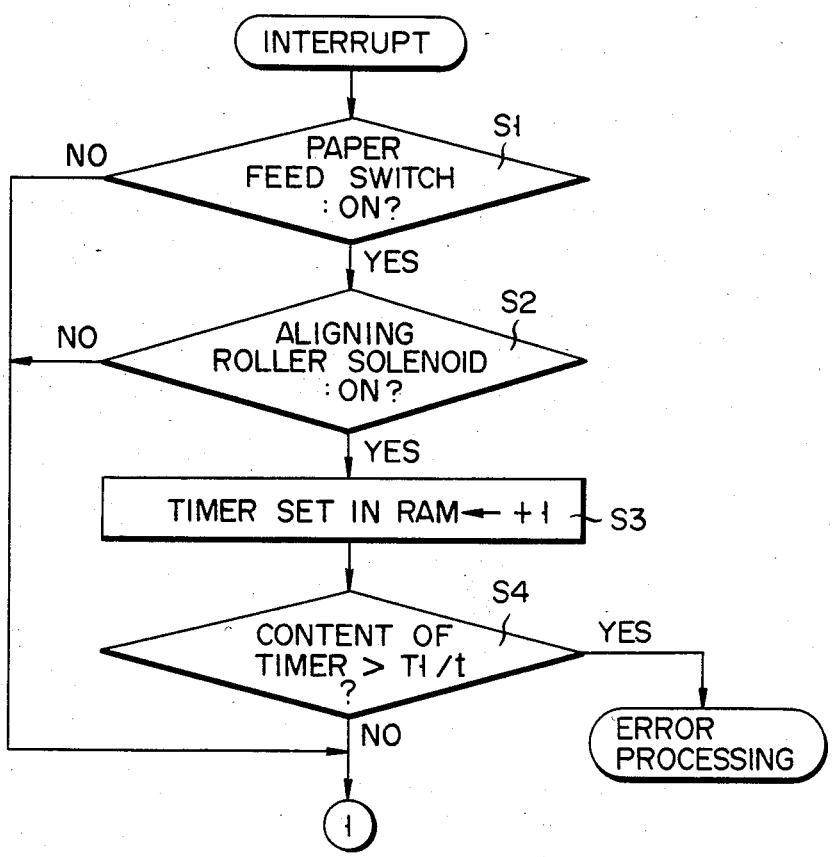
FIGS. 17A and 17B are respectively flow charts of the paper jam detecting operation.
Figure 17B:
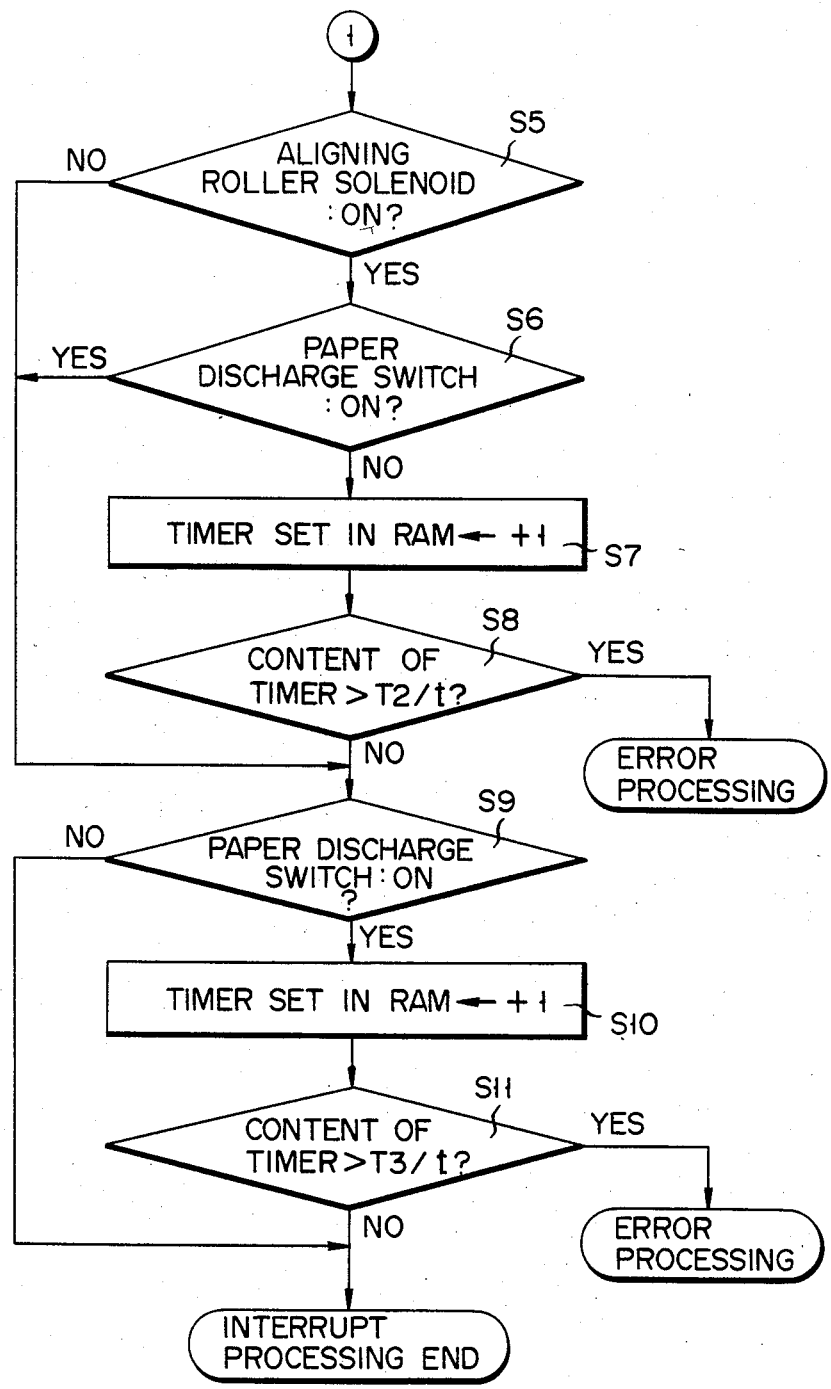

As described with reference to FIG. 14, malfunctions such as paper jamming are checked for by the microprocessor 61 during the copy operation. Paper jam detection will be described hereinafter. The paper jam check is performed by an interrupt program which is repeatedly executed at every predetermined period. The paper jam detection will be described with reference to the flow chart in FIGS. 17A, 17B. Steps S1 to S4, S5 to S8 and S9 to S11 perform different types of paper jam detection, respectively. Steps S1 to S4 of FIG. 17A check for a malfunction or an error of a type wherein the feed switch 22 is not turned on within a predetermined time T1 after the aligning rollers 11a, 11b are rotated to feed the sheet P. More particularly, when an interrupt period is given to be t, and the microprocessor detects in step S2 that the aligning roller solenoid 65 is kept on after the ON operation of the feed switch 22 is detected in step S1, a timer set in the RAM 73 is incremented by one (the initial value of the timer is zero) in step S3. Since the interrupt is generated at every interrupt period t, a given address of the RAM 73 can serve as a timer. The microprocessor checks in step S4 whether or not the count of the timer exceeds T1/t. If YES in step S4, i.e., when the feed switch 22 is kept on for over the time T1 after the aligning rollers 11a, 11b are rotated, error processing is executed. Steps 5 to 8 of FIG. 17B represent an error check of a type wherein the leading edge of the sheet P is not detected by the paper discharge switch 23 within a predetermined time T2 after the aligning rollers 11a, 11b are rotated to feed the sheet P. For example, the sheet P is not properly separated from the photosensitive drum 2, or the sheet P is not properly supplied to the heat rollers 18a, 18b. More particularly, a timer set in the RAM 73 monitors the ON operation of the paper discharge switch 23 in step S6 after the aligning roller solenoid 65 is turned on in step S5 in the same manner as in steps S1 to S4. The microcomputer checks in step S8 whether or not the count of the timer exceeds T2/t. If YES in step S8, error processing is executed. Steps S9 to S11 represent an error check of a type wherein the paper discharge switch 23 is not turned off within a predetermined time T3 after it was turned on, i.e., jamming has occurred in the vicinity of the paper discharge switch 23 and the sheet cannot be discharged. More particularly, when steps S5 to S8 are properly executed, the paper discharge switch 23 is turned on. The microprocessor detects in step S9 that the paper discharge switch 23 is turned on, a timer set in the RAM 73 monitors the ON time of the paper discharge switch 23 in the same manner as in steps S1 to S4. The microprocessor checks in step S11 whether or not the count of the timer exceeds T3/t. If YES in step S11, error processing is performed.

Figure 18:
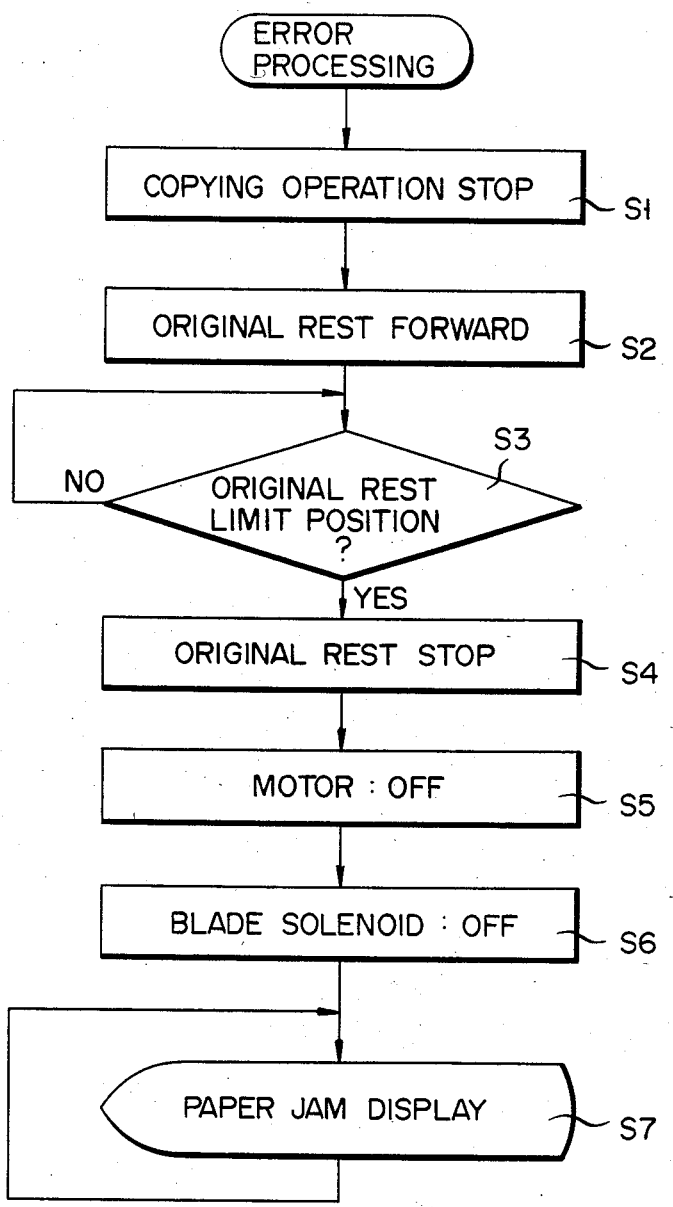
FIG. 18 is a flow chart of the operation of the original rest in the paper jam detecting operation mode.

Subsequently, the error processing described above will be described with reference to the flow chart of FIG. 18. In step S1, the copying operation is interrupted by interrupting the copying processes such as the charging, exposing, transferring, and peeling operations, and the operation advances to step S2. In step S2, a control signal is supplied to the original rest clutch 36 so as to move the original rest 3 in the forward direction, and the operation advances to step S3. In step S3, the microprocessor 61 determines whether or not the original rest 3 has moved to the original rest limit position which is detected when only the original rest switch 57 is turned on. If YES in step S3, the operation advances to step S4. In step S4, a control signal is supplied to the original rest clutch 36 so as to stop the original rest 3, and the operation advances to step S5. In step S5, the motor 21 is turned off, and the operation advances to step S6. In step S6, the blade solenoid 67 is turned off, thereby separating the blade of the cleaner 14 from the photosensitive drum 2, and the operation advances to step S7. In step S7, display of the paper jam is made and all other operations are stopped.

By performing this error processing, the original rest 3 is stopped at the original rest limit position (in the state of FIG. 11). This is the stop position in a direction along which the original rest 3 is naturally moved, when the upper unit 1a is opened in a direction indicated by the arrow c, as shown in FIG. 2. Therefore, the operator need not move the original rest 3 before he removes the jamming paper sheet, every time the paper jam occurs. Thus, if the operator opens the upper unit 1a for removing the jamming paper sheet, the original rest 3 has been fixed to its limit position and cannot be accidentally moved. Therefore, impact due to movement of the original rest 3 is prevented, so that undesirable damage to the original rest 3 or the housing 1 does not occur.

In the above embodiment, an electronic copying apparatus of original rest moving type is described, but the present invention is not limited to this and the present invention can be adopted in an electronic copying apparatus of fixed original type. In other words, the original rest is fixed in the housing 1 and an optical system such as an exposure lamp is provided on a moving table.

Furthermore, in the above embodiment, the present invention is adopted in an electronic copying apparatus, but the present invention is not limited to this. For example, the present invention can be adopted in an image forming apparatus such as a color copying machine.

Another embodiment of the present invention will be described with reference to FIGS. 19 to 22 hereinafter. In the second embodiment, when a toner empty state is detected as a malfunction, an original rest 3 is automatically stopped at a position at which it does not cover a toner replenishment port. The other configuration is the same as that of the first embodiment shown in FIG. 2, and only a portion of a developer 7 is shown for simplicity.

Figure 19:
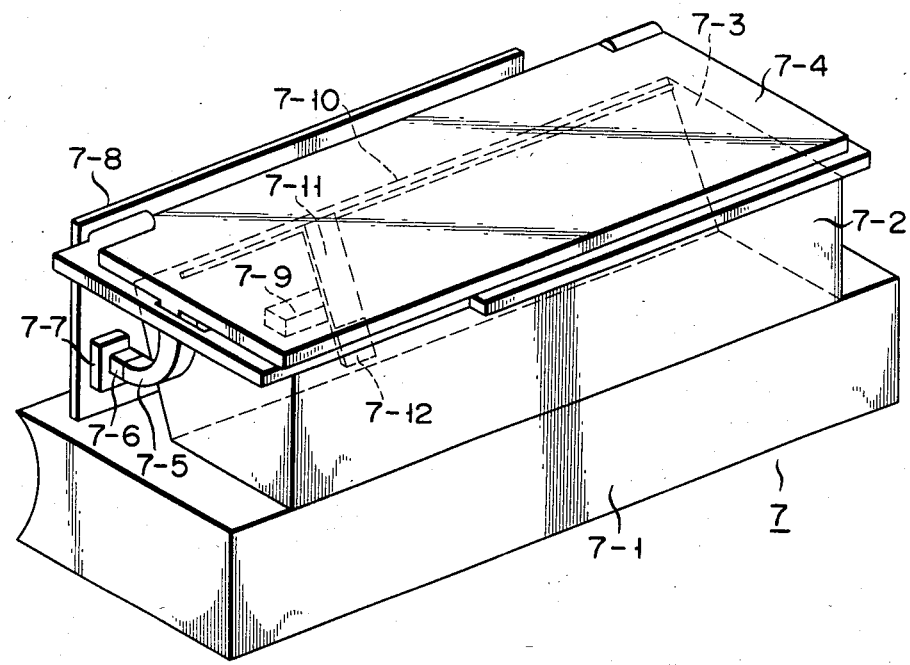
FIG. 19 is a perspective view schematically showing a configuration of a developer shown in FIG. 2.
Figure 20:
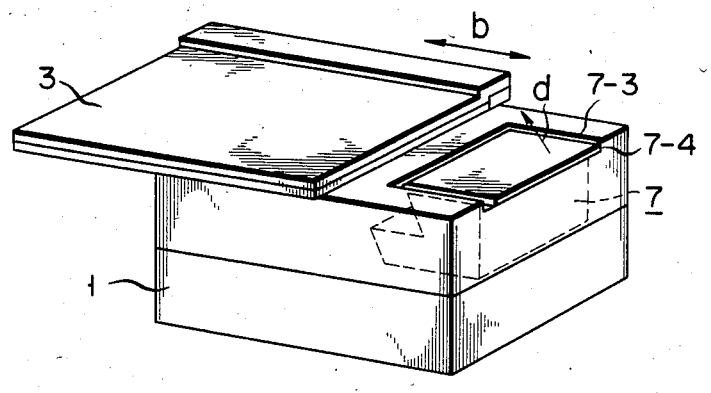
FIG. 20 is a perspective view showing the relationship between the original rest and a toner replenishment port shown in FIG. 2.

FIG. 19 schematically shows a configuration of the developer 7. Reference numeral 7-1 denotes a developer housing which stores a developing roller (not shown). A toner hopper 7-2 for storing toner as a developing agent is mounted at an upper portion of a rear end of the housing 7-1. Toner stored in the toner hopper 7-2 is supplied by a toner replenishment mechanism (not shown) in a predetermined amount, as the toner is consumed by the developing operation. Therefore, the toner hopper 7-2 has an opening as a toner replenishment port 7-3. A cap (to be referred to as a hopper cover hereinafter) 7-4 is pivotally mounted on the toner replenishment port 7-3 to be freely opened/closed. The toner replenishment port 7-3 and the hopper cover 7-4 are exposed from an upper surface of a housing 1 corresponding to a travelling path of the original rest 3, as shown in FIG. 20. When there is no more toner stored in the toner hopper 7-2, the operator opens the hopper cover 7-4 from the upper portion out of the housing 1 and can supply toner into the toner hopper 7-2. On the other hand, a curved arm 7-5 shown in FIG. 19 is mounted at one end portion of a lower surface of the hopper cover 7-4. In addition, a magnet 7-6 is mounted at a free end of the arm 7-5. A read switch 7-7 is provided at a portion opposite the magnet 7-6 mounted on the free end of the arm 7-5. The read switch 7-7 is mounted on a printed circuit board 7-8. Therefore, when the hopper cover 7-4 is opened, the magnet 7-6 is separated from the read switch 7-7 and the read switch 7-7 is turned off, thereby indicating that the hopper cover 7-4 is opened. On the printed circuit board 7-8, a read switch 7-9 for detecting the empty state of the toner hopper 7-2 is mountd. Furthermore, a plate arm 7-11 is provided in the toner hopper 7-2 corresponding to the read switch 7-9 and is pivoted through a predetermined angle about a shaft 7-10 while a motor 21 is rotated by a mechanism (not shown). A magnet 7-12 is mounted at a free end of the arm 7-11. Therefore, the read switch 7-9 is turned on/off when the magnet 7-12 is brought into contact or separated therefrom upon pivotal movement of the arm 7-11. When toner exists between the arm 7-11 and a side surface of the toner hopper 7-2, that is, when toner replenishment is not necessary, the magnet 7-12 mounted at the free end of the arm 7-11 is spaced apart from the read switch 7-9. Therefore, when the read switch 7-9 is turned on, it is confirmed that toner replenishment is needed.

Figure 21:
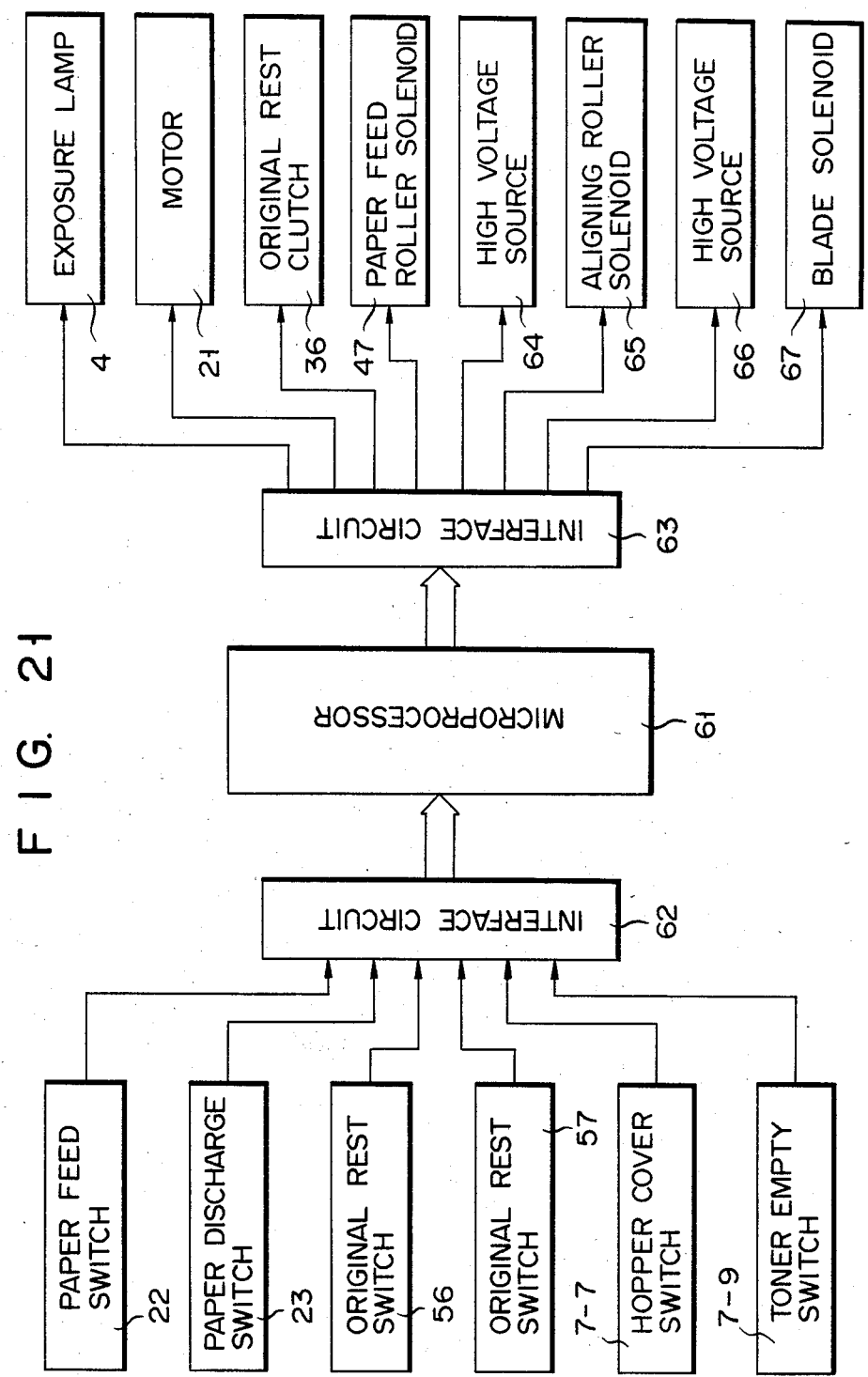
FIG. 21 is a block diagram showing an overall circuit configuration according to another embodiment of the present invention.

FIG. 21 schematically shows an overall control circuit. Note that the same reference numerals as in FIG. 12 denote the same parts in FIG. 21. Corresponding input signals are supplied to a microprocessor 61 through an interface circuit 62 from a paper feed siwtch 22, a paper discharging switch 23, original rest switches 56 and 57, a read switch 7-7 (to be referred to a hopper cover switch hereinafter) and the read switch 7-9 (to be referred to a toner empty switch hereinafter). The microprocessor 61 determines these input signals and processes them so as to generate various control signals through an interface circuit 63 in accordance with a predetermined program stored therein.

The operation of this embodiment shown in FIGS. 19 to 21 will be described with reference to a flow chart of FIG. 22. Steps S1 (copying start) to S15 (determination that the preset number of copying operations has been performed) are the same as those of the first embodiment as described in FIGS. 15A and 15B, and so a description thereof starts from step S16.

Figure 22:
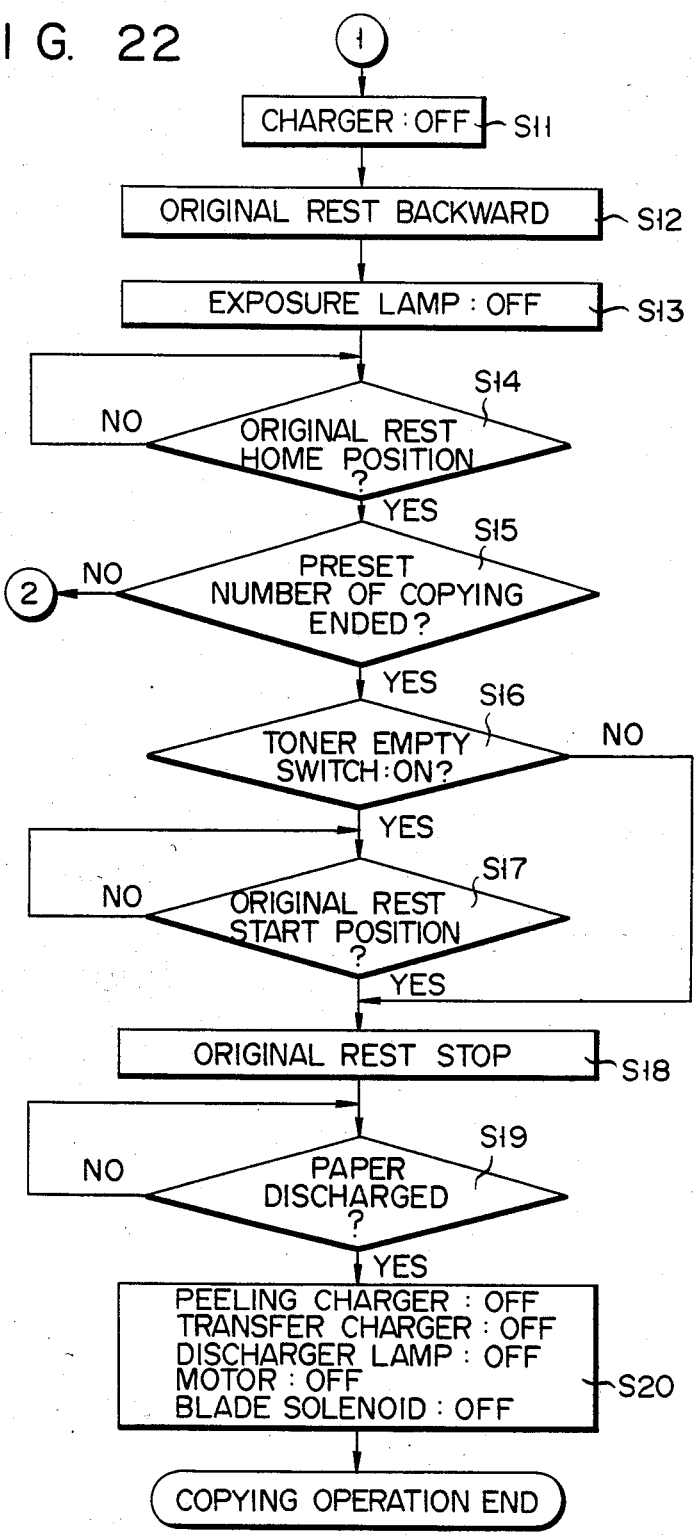
FIG. 22 is a flow chart for explaining the operation of the circuit shown in FIG. 21.

In FIG. 22, when the microprocessor 61 determines in step S15 that the preset number of copying operations has been performed, the operation advances to step S16. In step S16, the microprocessor 61 determines whether or not the toner empty switch 7-9 is turned on. If YES in step S16, the operation advances to step S17. In step S17, the original rest 3 is moved in the backward direction until the rest 3 is detected at the original rest start position. When the original rest start position is detected, the operation advances to step S18. In addition, if NO in step S16, toner replenishment is not necessary and so the routine jumps to step S18. In step S18, a control signal is supplied to an original rest clutch 36 so as to stop the original rest 3, and the operation advances to step S19. In step S19, the microprocessor 61 determines, in accordance with a signal from the paper discharing switch 23, whether or not a copied paper sheet P is discharged. If YES in step S19, the operation advances to step S20. In step S20, a high voltage source 66, a discharging lamp 15, a motor 21, and a blade solenoid 67 are respectively turned off, thereby ending the copying operation. Then, the copying apparatus is in the same standby state as in FIG. 15B.

By performing the above-mentioned control, when the toner must be replenished, the original rest 3 stops at the original rest start position, that is, the position shown in FIG. 20. After completing the copying operation, the copying apparatus is in the state wherein the hopper cover 7-4 can be freely opened/closed in a direction indicated by the arrow d in FIG. 20. Therefore, when the toner is to be supplied, the operator need not manually move the original rest 3 unlike in a conventional case. Furthermore, since the original rest 3 stops at a position different from a normal stop position, the fact that the malfunction has occured can be signalled to the operator.

What is claimed is:

1. A copying apparatus comprising:
   a housing including a lower unit and an upper unit which is pivotably mounted to said lower unit so that said upper unit can assume a closed postion and an open position, said upper unit being held at a substantially horizontal state in said closed position and being held at a tilted state in said open position;
   a moving table on which an original to be copied is positioned;
   guide means for slidably guiding said moving table along a surface of said upper unit in a direction which the moving table will naturally move due to gravity when said upper unit is tilted;
   means for positively driving said moving table along said guide means;
   detecting means for detecting the occurrence of a paper jam in said copying apparatus; and
   means for positively positioning said moving table at an end position of said guide means, which is a lower most position of said moving table, when said detecting means detects a jam.

2. A copying apparatus comprising:
   a housing;
   a moving table mounted on the housing on which an original to be copied is positioned;
   guide means for guiding said moving table along a surface of said housing thereby forming a travelling path of the moving table;
   a toner hopper having a toner replenishing opening facing said traveling path of the moving table, said toner replenishing opening being covered during at least a portion of said travelling path;
   means for positively moving said moving table along said guide means;
   detecting means for detecting a toner empty state in said toner hopper; and
   means for positively positioning said moving table at a position at which said toner replenishing opening is exposed in response to the detection of said empty state.

3. A copying apparatus according to claim 1, wherein said paper jam detecting means comprises:
   paper sheet detecting means for detecting a paper sheet picked up and taken from a paper sheet storing unit to a paper convey path;
   copied paper sheet detecting means for detecting a copied paper sheet discharged from said paper convey path;
   determination means for determining whether or not a discharged copied paper sheet is detected within a predetermined time since detection of said fed paper sheet; and
   means for determining that a paper jam has occurred when said discharged copied paper sheet is not detected by said determining means.

4. A copying apparatus according to claim 1, further comprising a plurality of magnets provided in an array along the travelling path of said moving table, the magnets being spaced apart by a predetermined distance from each other, and at least one switch provided at a position along said travelling path, said moving table positioning means being responsive to said at least one switch.

5. A copying apparatus according to claim 1, which further comprises a microprocessor for controlling said paper jam detecting means and moving table driving means.

6. A copying apparatus according to claim 2, wherein said detecting means includes a reed switch and a magnet which are respectively provided to oppose each other through the toner in said toner hopper, and urging means for driving said reed switch and said magnet to approach each other.

* * * * *